(12) United States Patent
Sun

(10) Patent No.: US 11,409,844 B2
(45) Date of Patent: Aug. 9, 2022

(54) SYSTEMS AND METHODS FOR LICENSE MANAGEMENT IN A DOMAIN-SEPARATED ARCHITECTURE

(71) Applicant: ServiceNow, Inc., Santa Clara, CA (US)

(72) Inventor: Benwen Sun, Mountain View, CA (US)

(73) Assignee: ServiceNow, Inc., Santa Clara, CA (US)

(*) Notice: Subject to any disclaimer, the term of this patent is extended or adjusted under 35 U.S.C. 154(b) by 742 days.

(21) Appl. No.: 16/272,864

(22) Filed: Feb. 11, 2019

(65) Prior Publication Data

US 2020/0257773 A1  Aug. 13, 2020

(51) Int. Cl.
  *G06F 21/10* (2013.01)
  *G06F 16/22* (2019.01)

(52) U.S. Cl.
  CPC ........ *G06F 21/105* (2013.01); *G06F 16/2246* (2019.01); *G06F 2221/0717* (2013.01)

(58) Field of Classification Search
  CPC ............... G06F 21/105; G06F 16/2246; G06F 2221/0717; G06F 21/10
  See application file for complete search history.

(56) References Cited

U.S. PATENT DOCUMENTS

| | | | |
|---|---|---|---|
| 6,321,229 B1 | 11/2001 | Goldman | |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 6,901,386 B1* | 5/2005 | Dedrick | G06Q 10/10 713/193 |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |

(Continued)

*Primary Examiner* — David Garcia Cervetti
(74) *Attorney, Agent, or Firm* — Fletcher Yoder, P.C.

(57) ABSTRACT

Present embodiments are directed toward a domain-separated license management system (DSLMS) for managing software license compliance in a domain-separated architecture, such as a domain-separated client instance. The DSLMS populates a domain tree structure with a determined number of software licenses assigned to, and a determined number of software licenses in use by, each granular domain of the instance, and this information is stored in the leaf nodes of the domain tree structure. The domain tree structure may be further populated to include a number of software licenses assigned to, and a number of software licenses in use by, each non-leaf node of the domain tree structure. Once populated, the domain tree structure is used to determine whether the represented domain-separated client instance is fully-compliant, partially-compliant, or non-compliant. Further, software licenses are rebalanced between the granular domains of a partially-compliant instance domain-separated client instance to bring the instance into full compliance.

19 Claims, 13 Drawing Sheets

(56) References Cited

U.S. PATENT DOCUMENTS

| | | | |
|---|---|---|---|
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,849,017 B2 * | 12/2010 | Znidarsic | G06Q 10/06 705/59 |
| 7,865,444 B1 * | 1/2011 | Biswas | G06F 21/105 705/79 |
| 7,890,802 B2 | 2/2011 | Gerber | |
| 7,925,981 B2 | 4/2011 | Pourheidar | |
| 7,930,396 B2 | 4/2011 | Trinon | |
| 7,933,927 B2 | 4/2011 | Dee | |
| 7,945,860 B2 | 5/2011 | Vambenepene | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,504,579 B1 * | 8/2013 | Broekhuijsen | G06F 16/9027 707/754 |
| 8,554,750 B2 | 10/2013 | Rangaranjan | |
| 8,561,131 B1 * | 10/2013 | Broekhuijsen | G06F 21/10 705/29 |
| 8,612,408 B2 | 12/2013 | Trinon | |
| 8,646,093 B2 | 2/2014 | Myers | |
| 8,650,296 B1 * | 2/2014 | Herington | G06F 9/5077 709/226 |
| 8,674,992 B2 | 3/2014 | Poston | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueeler | |
| 9,412,084 B2 | 9/2016 | Kowalski | |
| 9,467,344 B2 | 10/2016 | Gere | |
| 9,535,737 B2 | 1/2017 | Joy | |
| 9,557,969 B2 | 1/2017 | Sharma | |
| 9,613,070 B2 | 4/2017 | Kumar | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,811,806 B1 * | 11/2017 | Kuang | G06F 16/128 |
| 9,817,655 B1 * | 11/2017 | Mandrika | G06F 8/71 |
| 9,852,165 B2 | 12/2017 | Morozov | |
| 10,002,203 B2 | 6/2018 | George | |
| 10,503,784 B1 * | 12/2019 | Dean | G06F 16/248 |
| 10,564,622 B1 * | 2/2020 | Dean | G06F 16/9535 |
| 2001/0013024 A1 * | 8/2001 | Takahashi | G06F 21/10 705/59 |
| 2003/0018491 A1 * | 1/2003 | Nakahara | H04N 21/4112 348/E7.06 |
| 2003/0051151 A1 * | 3/2003 | Asano | G11B 20/00507 713/193 |
| 2005/0251487 A1 * | 11/2005 | Evans | G06F 21/10 705/59 |
| 2005/0273436 A1 * | 12/2005 | Coley | H04L 63/0428 705/59 |
| 2005/0289072 A1 * | 12/2005 | Sabharwal | G06F 21/121 705/59 |
| 2006/0026688 A1 * | 2/2006 | Shah | H04L 63/1416 726/25 |
| 2006/0155711 A1 * | 7/2006 | Jackson | G06F 21/105 |
| 2007/0192867 A1 * | 8/2007 | Miliefsky | G06F 21/577 726/25 |
| 2008/0027870 A1 * | 1/2008 | Nam | G06F 21/10 705/59 |
| 2008/0162360 A1 * | 7/2008 | Bantz | G06F 21/105 705/59 |
| 2008/0215468 A1 * | 9/2008 | Monsa-Chermon | G06Q 30/04 705/400 |
| 2008/0243699 A1 * | 10/2008 | Hilerio | G06F 21/105 705/58 |
| 2009/0319635 A1 * | 12/2009 | Christopherson | G06F 21/10 709/224 |
| 2010/0064362 A1 * | 3/2010 | Materna | H04L 41/5058 726/15 |
| 2010/0100778 A1 * | 4/2010 | Sullivan | H04L 41/0806 709/224 |
| 2011/0015957 A1 * | 1/2011 | Allen | G06Q 50/18 705/320 |
| 2011/0060922 A1 * | 3/2011 | Sasaki | G06Q 10/10 726/26 |
| 2011/0106826 A1 * | 5/2011 | Swanbeck | G06F 16/93 707/E17.014 |
| 2011/0246382 A1 * | 10/2011 | Allen | G06Q 30/018 705/317 |
| 2012/0255025 A1 * | 10/2012 | Roshchin | G06F 21/121 726/26 |
| 2013/0019316 A1 * | 1/2013 | Kacin | G06F 21/105 726/26 |
| 2013/0054601 A1 * | 2/2013 | Whitlock | G06F 16/21 707/E17.046 |
| 2013/0198734 A1 * | 8/2013 | Biswas | G06F 21/105 717/174 |
| 2014/0337924 A1 * | 11/2014 | Smith | H04L 63/10 726/4 |
| 2015/0181266 A1 * | 6/2015 | Tang | H04N 21/266 725/28 |
| 2015/0242862 A1 * | 8/2015 | Rupple | G06Q 30/018 705/317 |
| 2016/0224905 A1 * | 8/2016 | Paladino | G06Q 10/00 |
| 2016/0259922 A1 * | 9/2016 | Matsuo | G06F 21/121 |
| 2016/0350518 A1 * | 12/2016 | Mo | H04L 63/0442 |
| 2017/0357783 A1 * | 12/2017 | Rahn | G06F 21/105 |
| 2018/0131765 A1 * | 5/2018 | Puleston | G11C 11/00 |
| 2018/0239810 A1 * | 8/2018 | Pruitt | G06F 16/3328 |
| 2018/0253809 A1 * | 9/2018 | Meyer | H04L 67/141 |
| 2018/0321928 A1 * | 11/2018 | Borthakur | G06F 8/62 |
| 2019/0303541 A1 * | 10/2019 | Reddy | G06F 21/64 |
| 2019/0303579 A1 * | 10/2019 | Reddy | G06F 21/51 |
| 2019/0305959 A1 * | 10/2019 | Reddy | G06F 8/60 |
| 2019/0306173 A1 * | 10/2019 | Reddy | H04L 9/0637 |
| 2019/0318064 A1 * | 10/2019 | Paladino | G06F 11/3006 |
| 2019/0340271 A1 * | 11/2019 | Faulhaber | G06F 16/2455 |
| 2019/0340337 A1 * | 11/2019 | Faulhaber | G06F 21/105 |
| 2019/0340557 A1 * | 11/2019 | Faulhaber | G06F 16/2264 |
| 2019/0392119 A1 * | 12/2019 | Rahiman | H04L 63/12 |

* cited by examiner

SYSTEMS AND METHODS FOR LICENSE MANAGEMENT IN A DOMAIN-SEPARATED ARCHITECTURE

BACKGROUND

The present disclosure relates generally to software license management, and more specifically, to managing software license compliance in a domain-separated architecture.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Within the cloud computing infrastructure, an entity may have a domain-separated client instance including any suitable number of hierarchical domains. For example, a top-level domain associated with a particular entity may include different subdomains for each company, business, department, and/or region of the entity. Additionally, various pieces of licensed software may be executed by the various domains of the entity. When the domain-separated client instance has fewer licenses than the number of copies of the software in use, the domain-separated client instance, as well as the corresponding entity, may described as being non-compliant. Since non-compliance can result in fees/fines that can exceed the cost of purchasing additional licenses, it is desirable for entities to be able to identify and address software license non-compliance in an effective and efficient manner.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed toward a domain-separated license management system (DSLMS) for managing software license compliance in a domain separation architecture. Within the DSLMS, the domain-separated client instance is represented as a domain tree structure, in which leaf nodes represent granular domains (e.g., departments, regions) of the instance, while non-leaf nodes represent larger domains that are groups of granular domains (e.g., businesses, companies, or groups of companies). To populate this domain tree structure, the DSLMS executes discovery/reconciliation jobs to determine a number of software licenses assigned to, and a number of software licenses in use by, each granular domain of the instance, and this information is stored in the leaf nodes of the domain tree structure. Subsequently, based on the license data stored in directly or indirectly dependent leaf nodes, the domain tree structure is traversed to determine and update a number of software licenses assigned to, and a number of software licenses in use by, each non-leaf node of the domain tree structure.

Once the domain tree structure has been populated with license information, the DSLMS uses the license information stored in the top or root node to determine whether the domain-separated client instance, as a whole, is compliant. Additionally, the domain tree structure can be traversed to determine whether each domain of the domain-separated client instance represented in the domain tree structure is compliant. When the DSLMS determines that the domain-separated client instance, as a whole, is non-compliant, the system may provide a suitable output prompting the purchase of additional software licenses to bring the domain-separated client instance into compliance. When the DSLMS determines that the domain-separated client instance is partially-compliant (meaning that the instance, as a whole, is compliant, while one or more of the domains of the instance are non-compliant), available licenses from over-compliant domains of the domain-separated instance are reassigned to the non-compliant domains to rebalance the domain tree structure, bringing the domain-separated client instance into full compliance. Further, in certain embodiments, a weight or priority value may be assigned to each domain of the in the domain tree structure. For such embodiments, during rebalancing, the DSLMS ensures that higher weighted domains preferentially retain existing license assignments and/or receive available licenses before lower weighted domains of the domain-separated client instance.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
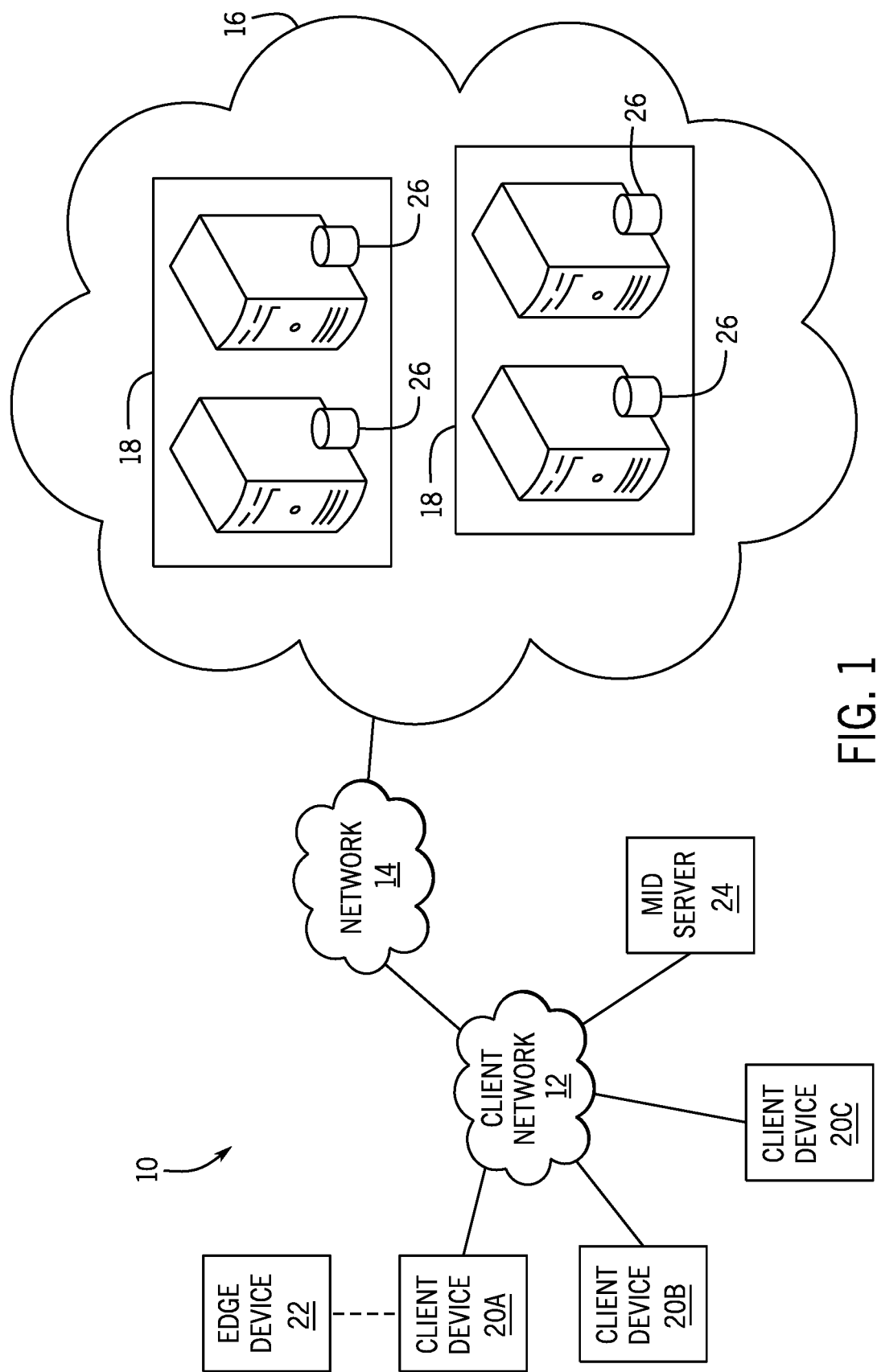
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As mentioned, a domain-separated client instance can include a number of domains arranged in a hierarchical manner. Additionally, various pieces of licensed software may be assigned to and used by various domains of the domain-separated client instance. When the domain-separated client instance has fewer software licenses than the number of copies of the software in use, the domain-separated client instance may be described herein as being non-compliant. When a domain-separated client instance has a sufficient number of software licenses assigned relative to the number of copies of the software in use, the domain-separated client instance may be described herein as being compliant, and when each domain of the domain-separated client instance also has a sufficient number of software licenses assigned relative to the number of copies of the software in use, the domain-separated client instance may further be described herein as being fully-compliant. When the domain-separated client instance has a sufficient number of software licenses assigned, but particular domains of the instance have fewer licenses assigned than the number of copies of the software in use, then the instance may be more specifically described herein as being partially-compliant. It may be appreciated that, within a non-compliant or partially-compliant domain-separated client instance, certain domains can have fewer licenses assigned that in use and are referred to herein as being non-compliant; certain domains have a sufficient number of licenses assigned and are referred to herein as being compliant; and certain domains may have a greater number of licenses assigned than in use and are referred to herein as being over-compliant.

With the foregoing in mind, present embodiments are directed toward a domain-separated license management system (DSLMS) for managing software license compliance in a domain-separated client instance. Within the DSLMS, the domain-separated client instance is represented by a domain tree structure, in which leaf nodes represent granular domains (e.g., departments, regions) of the instance, while non-leaf nodes represent larger domains that are groups of granular domains (e.g., businesses, companies, or groups of companies). As discussed below, the DSLMS is configured to populate the domain tree structure with license information, and then use the domain tree structure to determine and manage compliance within the domain-separated client instance. For example, the DSLMS is configured to determine whether a domain tree structure, as well as the domain-separate client instance it represents, is fully-compliant, partially-compliant, or non-compliant. As discussed below, when the DSLMS determines that the domain-separated client instance is partially-compliant, available licenses from over-compliant domains of the instance are reassigned to the non-compliant domains of the instance to rebalance the domain tree structure, making the domain-separated client instance fully-compliant. Further, in certain embodiments, a priority value may be assigned to each domain of the in the domain tree structure, such that, during rebalancing, the DSLMS ensures that higher weighted domains of the instance preferentially retain existing license assignments and/or receive available licenses before lower weighted domains of the domain-separated client instance.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
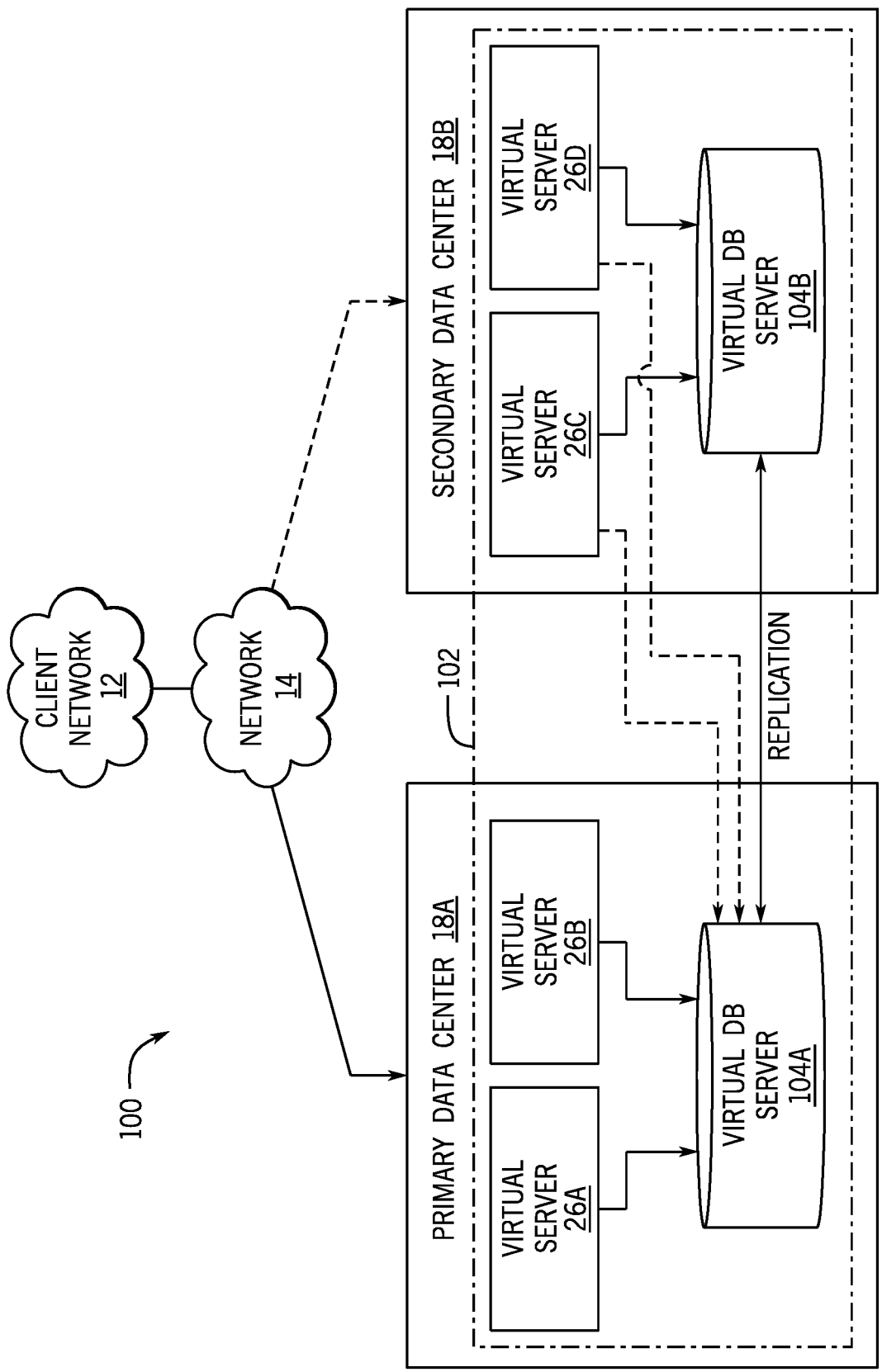
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
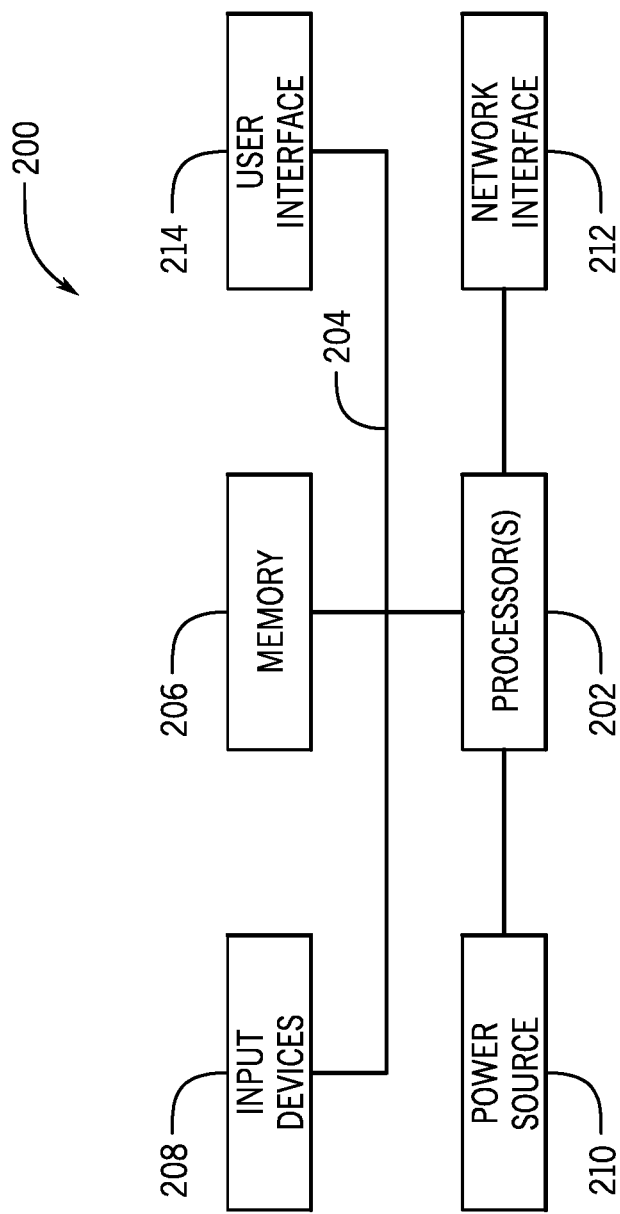
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
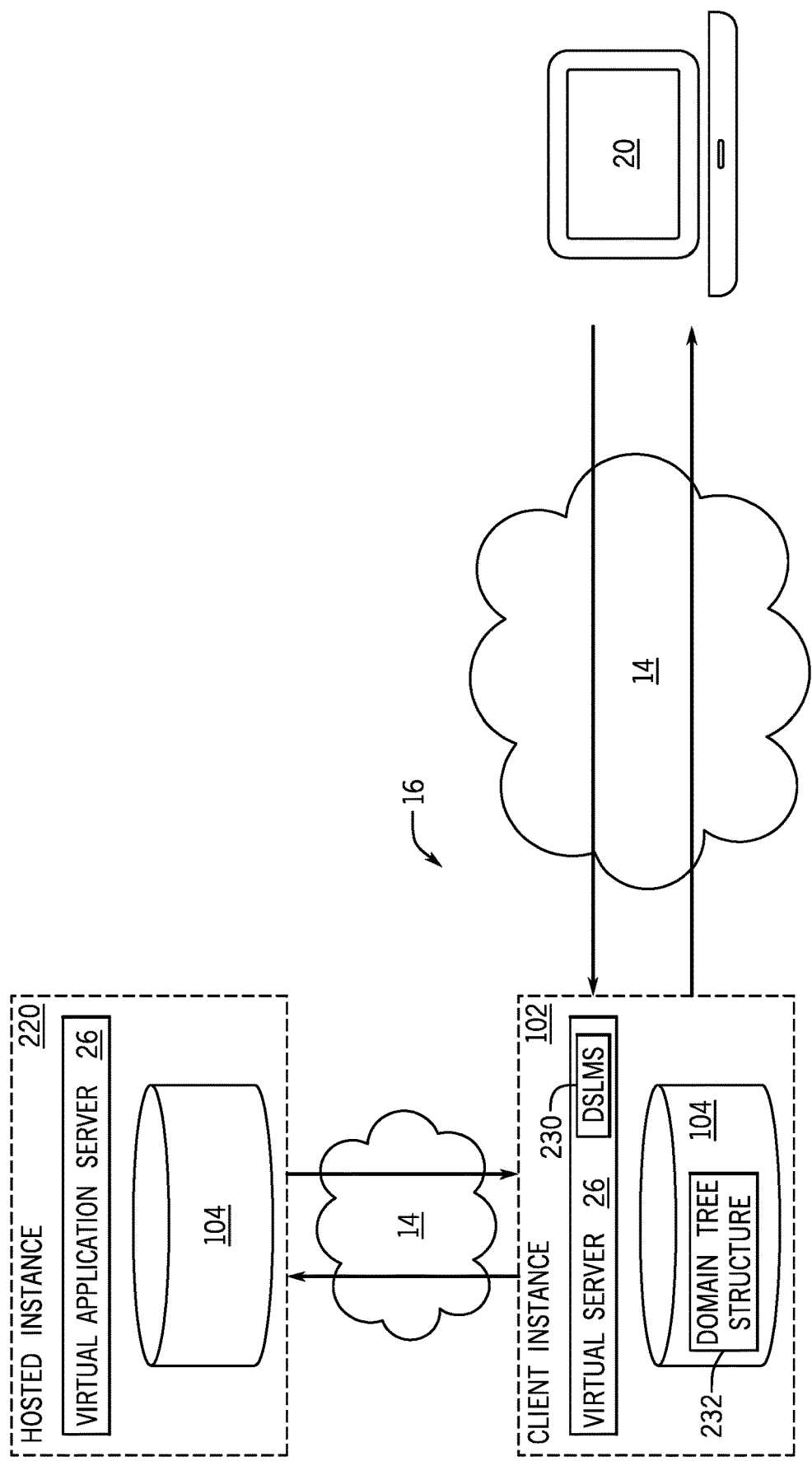
FIG. 4 is a block diagram illustrating an embodiment in which a virtual server supports and enables a domain-separated client instance that includes a domain-separated licensing management system (DSLMS) configured to manage software licenses across the domain-separated client instance, in accordance with aspects of the present disclosure.

With the foregoing in mind, FIG. 4 is a block diagram illustrating an embodiment in which a virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser. The client instance 102 may also be configured to communicate with other instances, such as the hosted instance 220 shown in FIG. 4, which may also include a virtual application server 26 and a virtual database server 104.

For present embodiments, the client instance 102 illustrated in FIG. 4 is, more specifically, a domain-separated client instance 102. As such, the domain-separated client instance 102 includes a number of domains, each representing a portion of the client organization. Accordingly, each client device 20 may have a current session that is associated with a particular domain of the client instance 102. For example, in certain embodiments, when the current session of the client device 20 is associated with a particular domain of the domain-separated client instance 102, then the client device 20 can only access data in the database 104 that is associated with the particular domain, as well as subdomains of the particular domain.

The domain-separated client instance 102 illustrated in FIG. 4 includes a domain-separated licensing management system (DSLMS) 230 that is hosted by the virtual server 26, or another suitable server associated with the instance. The DSLMS 230 is an application that includes instructions executable by one or more processors of the cloud-based platform 16 or data center 18 to manage software licenses across all domains of the domain-separated client instance 102. Additionally, the database 104 of the illustrated domain-separated client instance 102 includes one or more database tables that store a domain tree structure 232 populated and used by the DSLMS 230 to manage software licenses across all domains of the domain-separated client instance 102.

Figure 5:
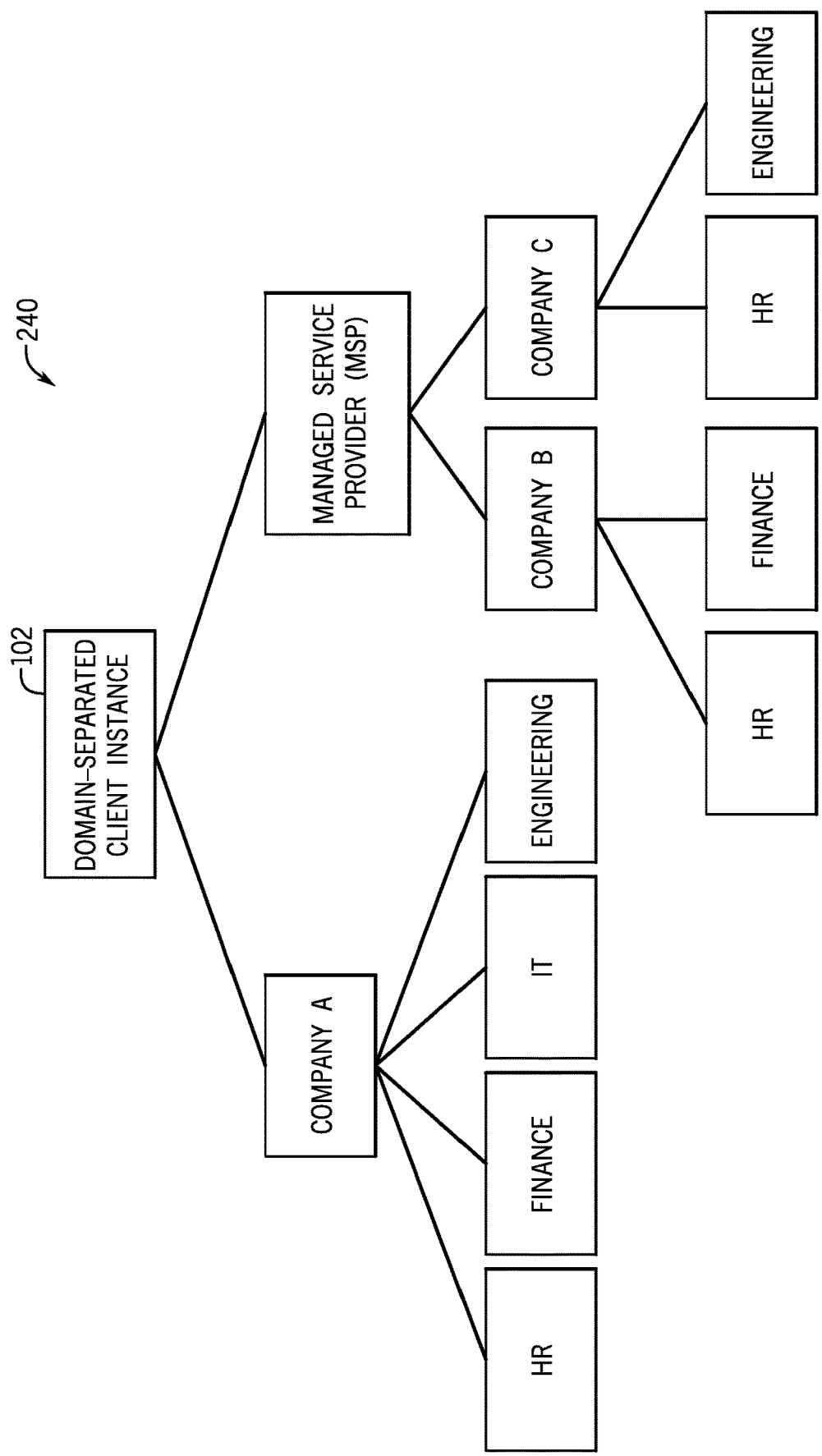
FIG. 5 is a diagram illustrating a hierarchical domain structure of an example embodiment of a domain-separated client instance, in accordance with aspects of the present disclosure.

FIG. 5 is a diagram illustrating an example hierarchical domain structure 240 for an embodiment of the domain-separated client instance 102. The illustrated domain-separated client instance 102 includes "Company A" and "MSP" as the primary subdomains of the instance 102. The "Company A" domain includes a number of sub domains, including a "HR" domain, a "Finance" domain, an "IT" domain, and an "Engineering" domain, which are all granular domains. As used herein, "granular domain" refers to a domain that does not include any subdomains. The "MSP" domain has two subdomains, including a "Company B" domain and a "Company C" domain. In turn, the "Company B" domain has a number of granular subdomains, including an "HR" domain and a "Finance" domain, and the "Company C" domain has a number of granular subdomains, including an "HR" domain and an "Engineering" domain.

Figure 6:
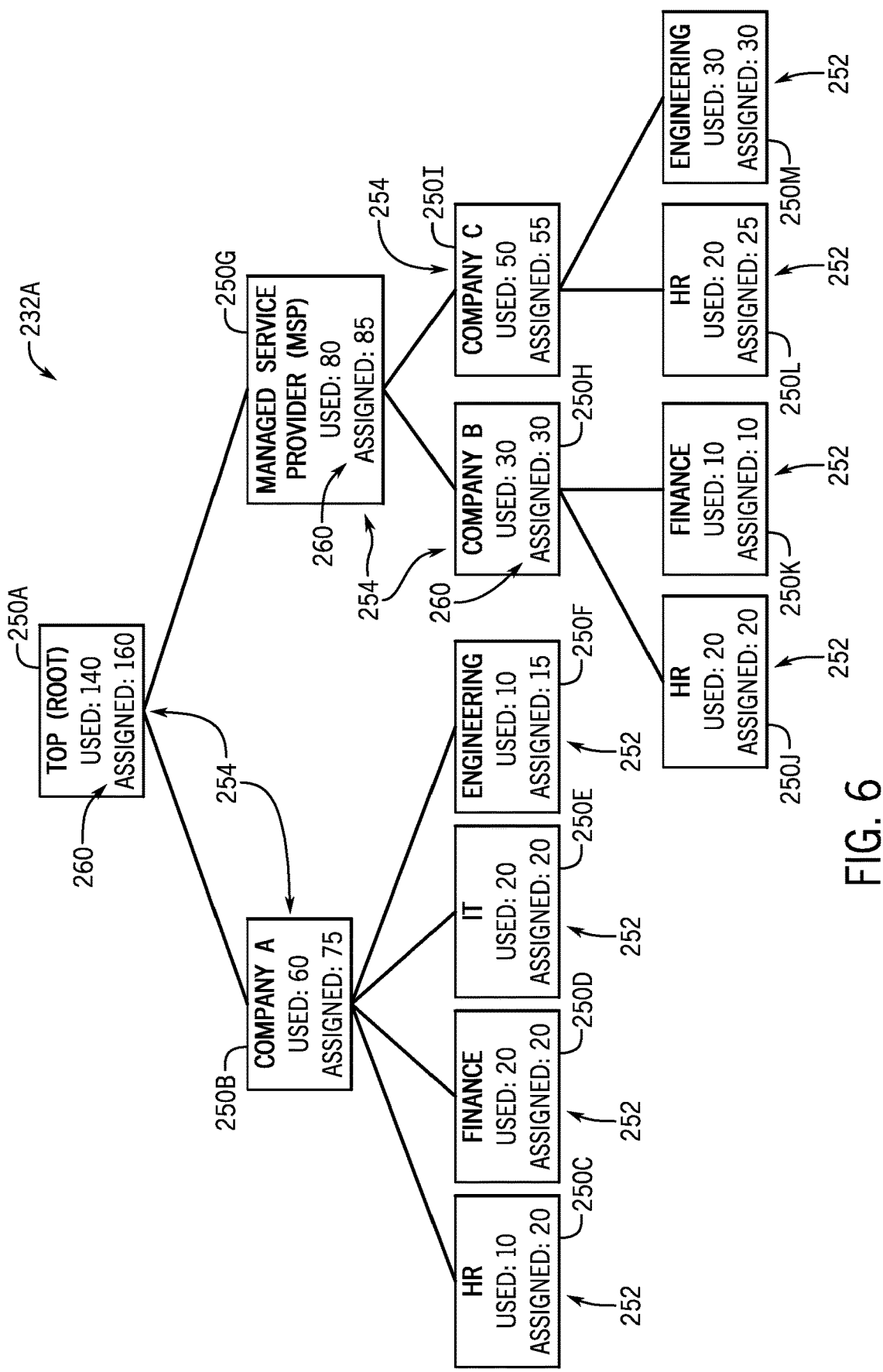
FIG. 6 is a diagram illustrating an example embodiment of a fully-compliant domain tree structure that is representative of the hierarchical domain structure of FIG. 5, in accordance with aspects of the present disclosure.

With the foregoing in mind, FIG. 6 is a diagram illustrating an example of a domain tree structure 232A stored in the database 104 that is representative of the hierarchical domain structure 240 of FIG. 5. The illustrated domain tree structure 232A includes a number of nodes 250, including a number of leaf nodes 252 and a number of non-leaf nodes 254. More specifically, for the example of FIG. 6, the illustrated domain tree structure 232A includes a respective node for each domain in the hierarchical domain structure 240 of FIG. 5, arranged in the same hierarchical manner. In particular, the top or root node 250A is representative of the entire domain-separated client instance 102, node 250B represents the "Company A" domain, and leaf nodes 250C, 250D, 250E, and 250F represent the "HR", "Finance", "IT" and "Engineering" granular domains, respectively. Node 250G represents the "MSP" domain, node 250H represents the "Company B" domain and node 250I represents the "Company C" domain. Leaf nodes 250J and 250K respectively represent the "HR" and "Finance" granular domains of the "Company B" domain, and leaf nodes 250L and 250M respectively represent the "HR" and "Engineering" granular domains of the "Company C" domain.

Additionally, the example domain tree structure 232A illustrated in FIG. 6 has been populated with license information 260 related to a particular piece of licensed software. As such, each of the illustrated nodes 250 store license information 260 that includes: a number of software licenses used by the domain, and a number of software licenses assigned to the domain. As discussed in greater detail below, the license information 260 for the leaf nodes 252 may be determined by executing a discovery/reconciliation job on the corresponding domain, while the license information 260 for non-leaf nodes 254 may be calculated by summing the number of software licenses used by all directly and indirectly dependent domains, and by summing the number of software licenses assigned to all directly and indirectly dependent domains.

With the foregoing in mind, the example domain tree structure 232A illustrated in FIG. 6 represents a fully compliant domain-separated client instance 102. That is, for each domain represented in the domain tree structure 232A illustrated in FIG. 6, the representative nodes 250 each have a number of software licenses used that is less than or equal to the number of software licenses assigned. It may be appreciated that, while the license information 260 for each of the nodes 250 illustrated in FIG. 6 pertains to one particular piece of software for simplicity, in other embodiments, the license information 260 may include software license assignments and usage for multiple pieces of software, in accordance with the present disclosure.

Figure 7:
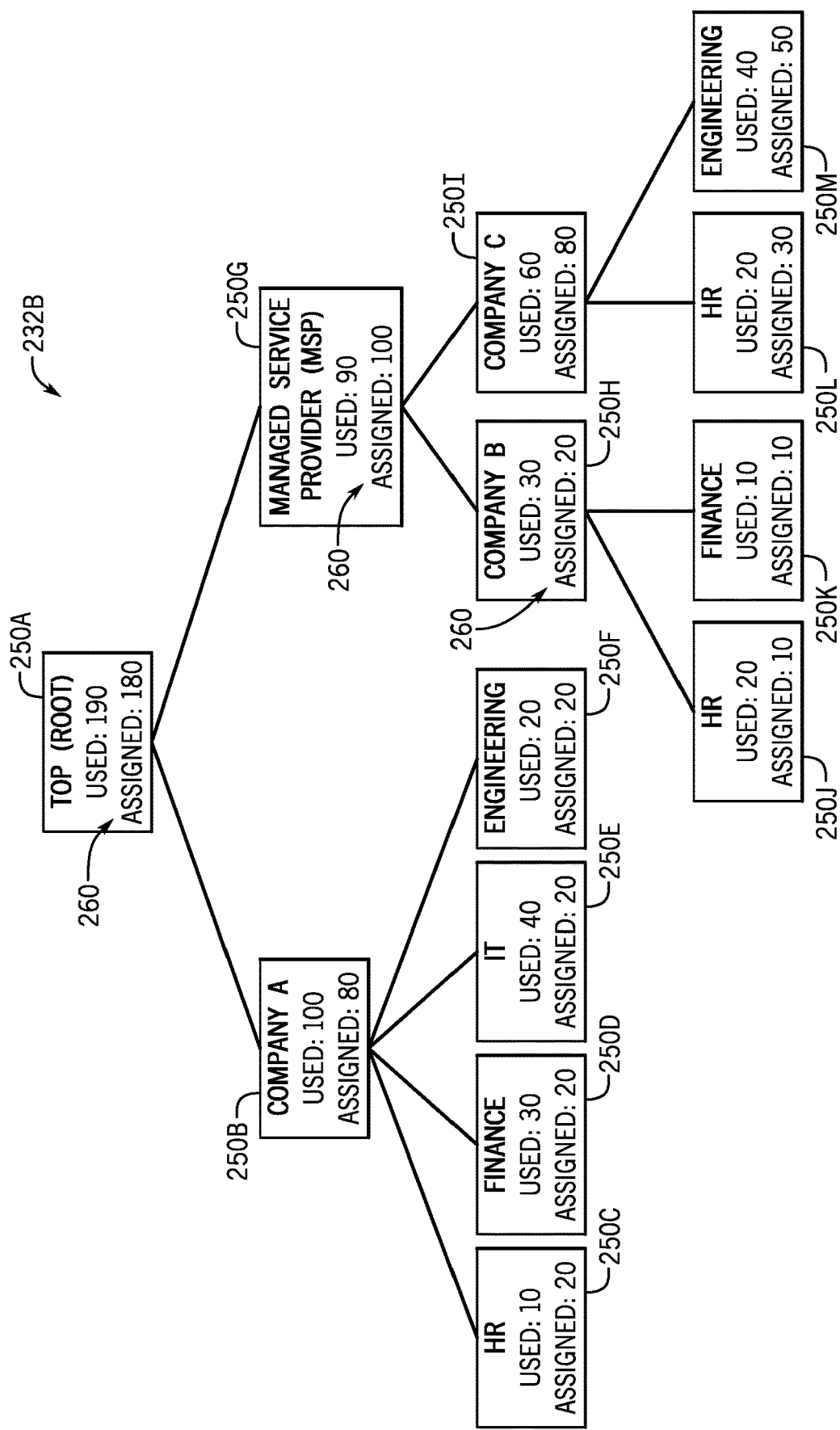
FIG. 7 is a diagram illustrating an example embodiment of a non-compliant domain tree structure that is representative of the hierarchical domain structure of FIG. 5, in accordance with aspects of the present disclosure.

FIG. 7 is a diagram illustrating another example of a domain tree structure 232B that is representative of the hierarchical domain structure 240 of FIG. 5. However, the example domain tree structure 232B of FIG. 7 is populated with different license information 260 relative to the domain tree structure 232A of FIG. 6. In particular, in FIG. 7, the license information 260 of the root node 250A indicates non-compliance, meaning the total number of software licenses used by the domain-separated client instance 102 is greater than the total number of software licenses assigned to the domain-separated client instance 102. As such, the domain tree structure 232B of FIG. 7 is an example of a non-compliant domain tree structure, which is representative of a non-compliant hierarchical domain structure 240. Additionally, it may be appreciated that, upon determining that the root node 252A is non-compliant, since the license information of non-leaf nodes is computed based on the depending leaf nodes, at least a portion of the subdomains represented by the remaining nodes 250B-250M can be assumed to be non-compliant without expressly traversing the domain tree structure 232B and testing the compliance of each of the nodes 250.

Figure 8:
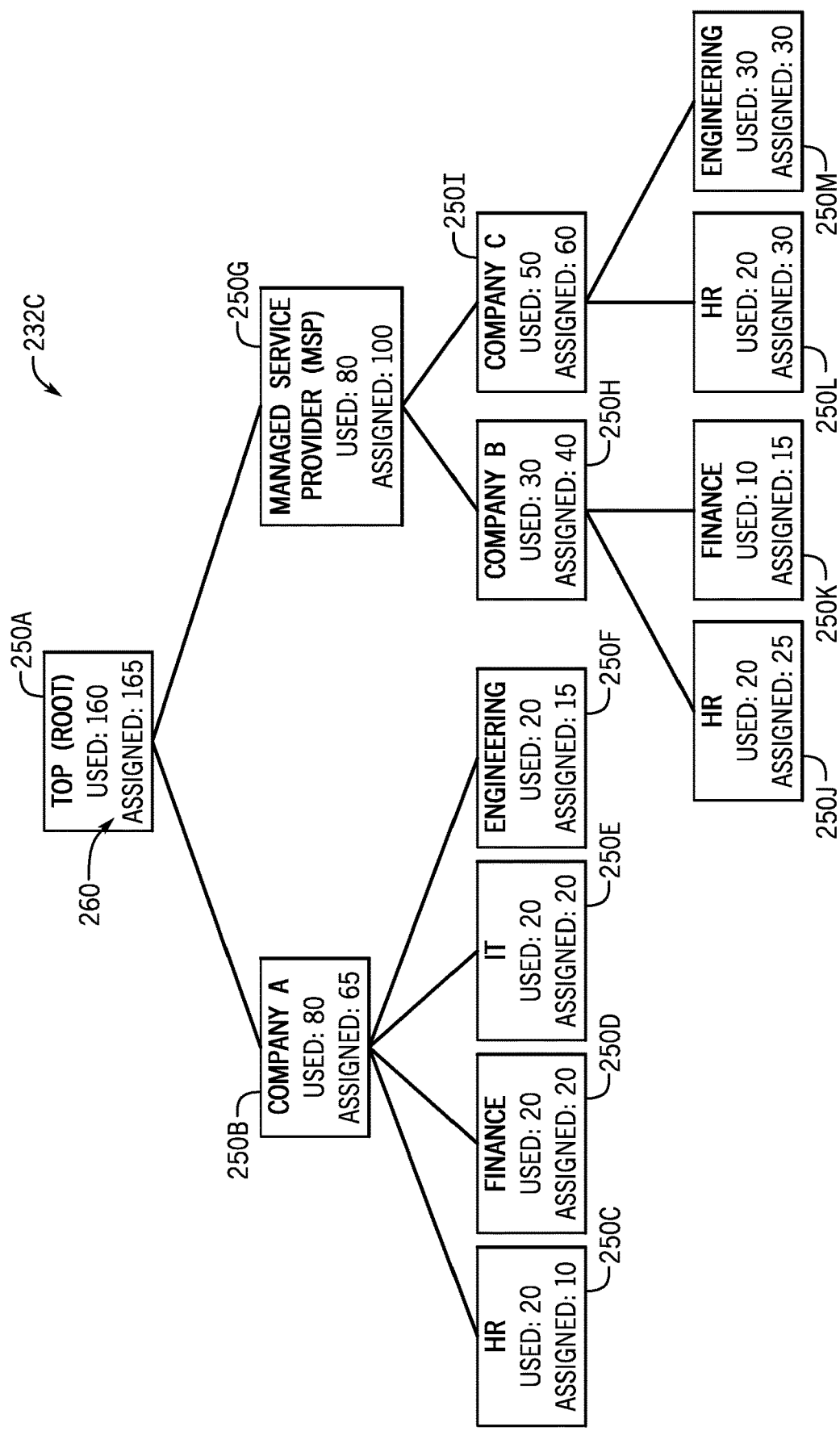
FIG. 8 is a diagram illustrating an example embodiment of a partially-compliant domain tree structure that is representative of the hierarchical domain structure of FIG. 5, in accordance with aspects of the present disclosure.

FIG. 8 is a diagram illustrating another example of a domain tree structure 232C that is representative of the hierarchical domain structure 240 of FIG. 5. However, the example domain tree structure 232C of FIG. 7 is populated with different license information 260 relative to the domain tree structures 232A and 232B of FIGS. 6 and 7. In particular, the example domain tree structure 232C illustrated in FIG. 8 is a partially-compliant domain tree structure, which is representative of a partially-compliant hierarchical domain structure 240. As mentioned, the partially-compliant domain tree structure 232C is a domain tree structure in which the total number of software licenses assigned to the domain-separated client instance 102 is greater than or equal to the total number of software licenses used by the domain-separated client instance 102; however, one or more domains represented by the nodes 250 of the domain tree structure 232C have a greater number of software licenses in use than assigned. As set forth below, when the disclosed DSLMS 230 identifies the partially-compliant domain tree structure 232C, the DSLMS 230 is designed to rebalance software license assignments across the domains of the hierarchical domain structure 240 until the domain tree structure 232C becomes fully-compliant.

Figure 9:
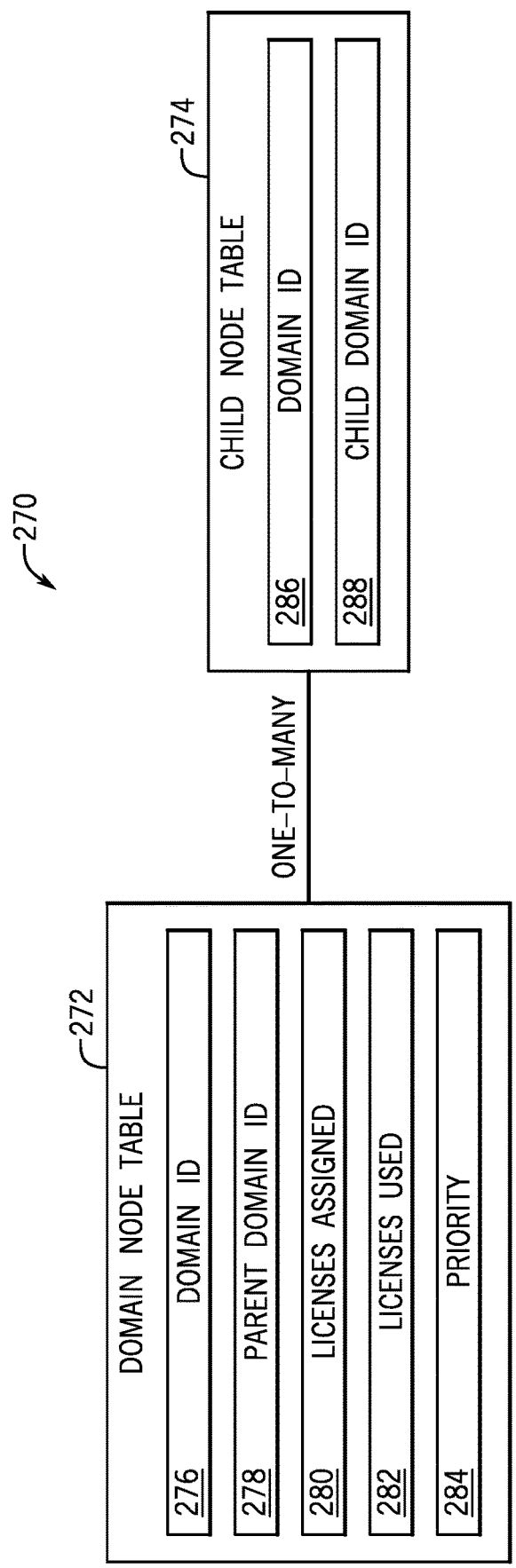
FIG. 9 is a diagram illustrating an example embodiment of a database table structure designed to implement and store the domain tree structure, in accordance with aspects of the present disclosure.

As mentioned with respect to FIG. 4, the domain tree structure 232 may be stored in the database 104. With this in mind, FIG. 9 is a diagram illustrating an example of a database table structure 270 designed to implement and store the domain tree structure 232. For the illustrated embodiment, the database table structure 270 includes a domain node table 272 and a child node table 274 having a one-to-many relationship. The domain node table 272 includes a "Domain ID" field 276 that serves a primary key, a "Parent Domain ID" field 278 that references the "Domain ID" field 276, a "Licenses Assigned" field 280 that stores a non-negative integer value, a "Licenses Used" field 282 that stores a non-negative integer value, and a "Priority" field 284 that stores an integer value. The child node table 274 includes a "Domain ID" field 286 and a "Child Domain ID" field 288 that each reference the "Domain ID" field 276 of the domain node table 272. As such, for the illustrated embodiment, the "Parent Domain ID" field 278 of the domain node table 272 and the fields 286 and 288 of the child node table 272 cooperate to store and define the shape of the domain tree structure 232, such that the DSLMS 230 is able to traverse the domain tree structure 232 by following the references to different "Domain ID" values stored in these fields. It may be appreciated that, in other embodiments, the domain node table 272 may lack the "Parent Domain ID" field 278, advantageously reducing the size of the table, and the shape of the domain tree structure 232 may be stored and defined using only the fields 286 and 288 of the child node table 272. For such embodiments, the DSLMS 230 is able to traverse the domain tree structure 232 by following the references to different "Domain ID" values stored the fields 286 and 288 of the child node table 272. Additionally, as mentioned, for leaf nodes 252 of the domain tree structure 232, the values stored in the "Licenses Assigned" field 280 and the "Licenses Used" field 282 are determined for each domain, while for non-leaf nodes 254, these fields are calculated based on the values stored in depending leaf nodes. It may be also be appreciated that, for embodiments in which multiple pieces of licensed software associated with the domain-separated client instance 102 are being managed by the DSLMS 230, the domain node table 272 may include at least a respective "Licenses Assigned" field and the "Licenses Used" field for each piece of software.

Figure 10:
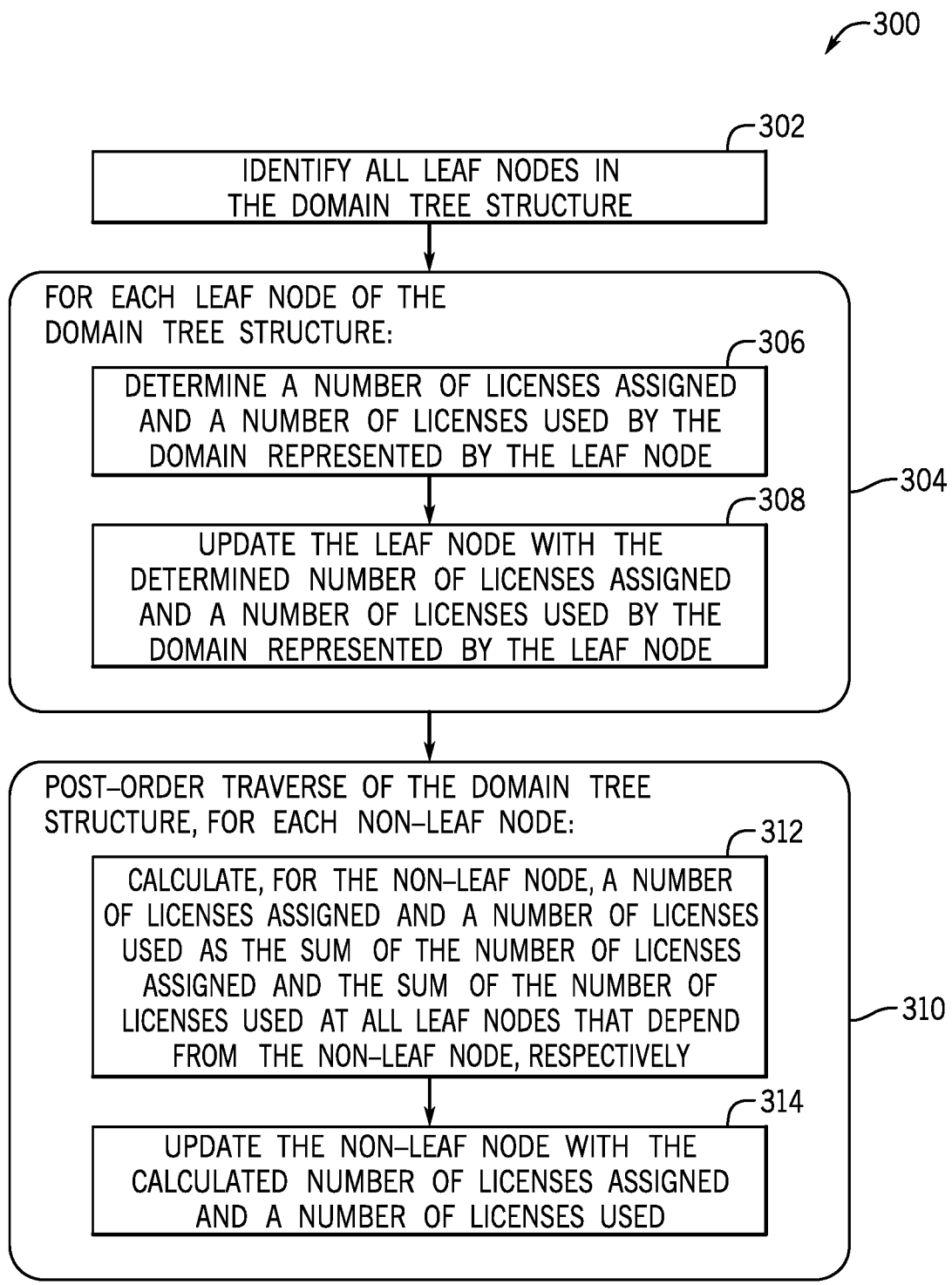
FIG. 10 is a flow diagram illustrating an embodiment of a process whereby the DSLMS populates license information for nodes of the domain tree structure, in accordance with aspects of the present disclosure.

FIG. 10 is a flow diagram illustrating an embodiment of a process 300 by which the DSLMS 230 populates or updates the license information within the domain tree structure 232. The illustrated process 300 is merely an example, and in other embodiments, the process 300 may include additional steps, fewer steps, repeated steps, and so forth, in accordance with the present disclosure. The illustrated process 300 may be stored in at least one suitable memory (e.g., memory 206) and executed by at least one suitable processor (e.g., processor 202). In certain embodiments, the process 300 may be configured to be executed on-request or on a recurring basis (e.g., every week, every day, every hour, every 10 minutes, and so forth), depending on the aggressiveness of the licensing management strategy of the domain-separated client instance 102.

The illustrated process 300 begins with the processor 202 identifying (block 302) all leaf nodes 252 of the domain tree structure 232. For example, in certain embodiments, the DSLMS 230 may query the domain node table 272 illustrated in FIG. 9 for all nodes 250 that do not have any related records indicated in the child node table 274. The process 300 of FIG. 10 continues with a "for loop" that performs a set of actions in series for each of the leaf nodes 252, as identified by block 304. The actions within the "for loop" of block 304 include first determining (block 306) a number of licenses assigned to, and a number of licenses used by, the domain represented by a leaf node, and then updating (block 308) the license information 260 of the leaf node based on these values. As mentioned, the license information 260 for each leaf node 252 may be determined by executing a discovery and/or reconciliation job on or within the corresponding domain. The discovery/reconciliation jobs are processes that include instructions to access each domain of the domain-separated client instance 102 to identify and count all software licenses that have been assigned or allocated to each domain, and to identify and count a number of these software licenses that are currently in use by each domain.

The embodiment of the process 300 illustrated in FIG. 10 continues with a post-order traversal of the domain tree structure 232, wherein a set of actions are performed for each non-leaf node encountered during the traversal, as indicated by the block 310. For the illustrated embodiment, these actions include calculating (block 312) license information 260 for a particular non-leaf node and then updating (block 314) the non-leaf node with this information. More specifically, for each non-leaf node, the number of licenses assigned and a number of licenses used are respectively calculated as the sum of all licenses assigned and the sum all licenses used at all leaf nodes that depend, directly or indirectly, from the non-leaf node. It may be appreciated that the post-order traversal and actions performed for each non-leaf node represented by block 310 may be performed after any update to license information 260 of one or more leaf nodes 252, which may occur as the result of a purchase of additional software licenses, a sale or expiration of assigned licenses, or a transfer of licenses between domains during rebalancing, as discussed below.

Figure 11:
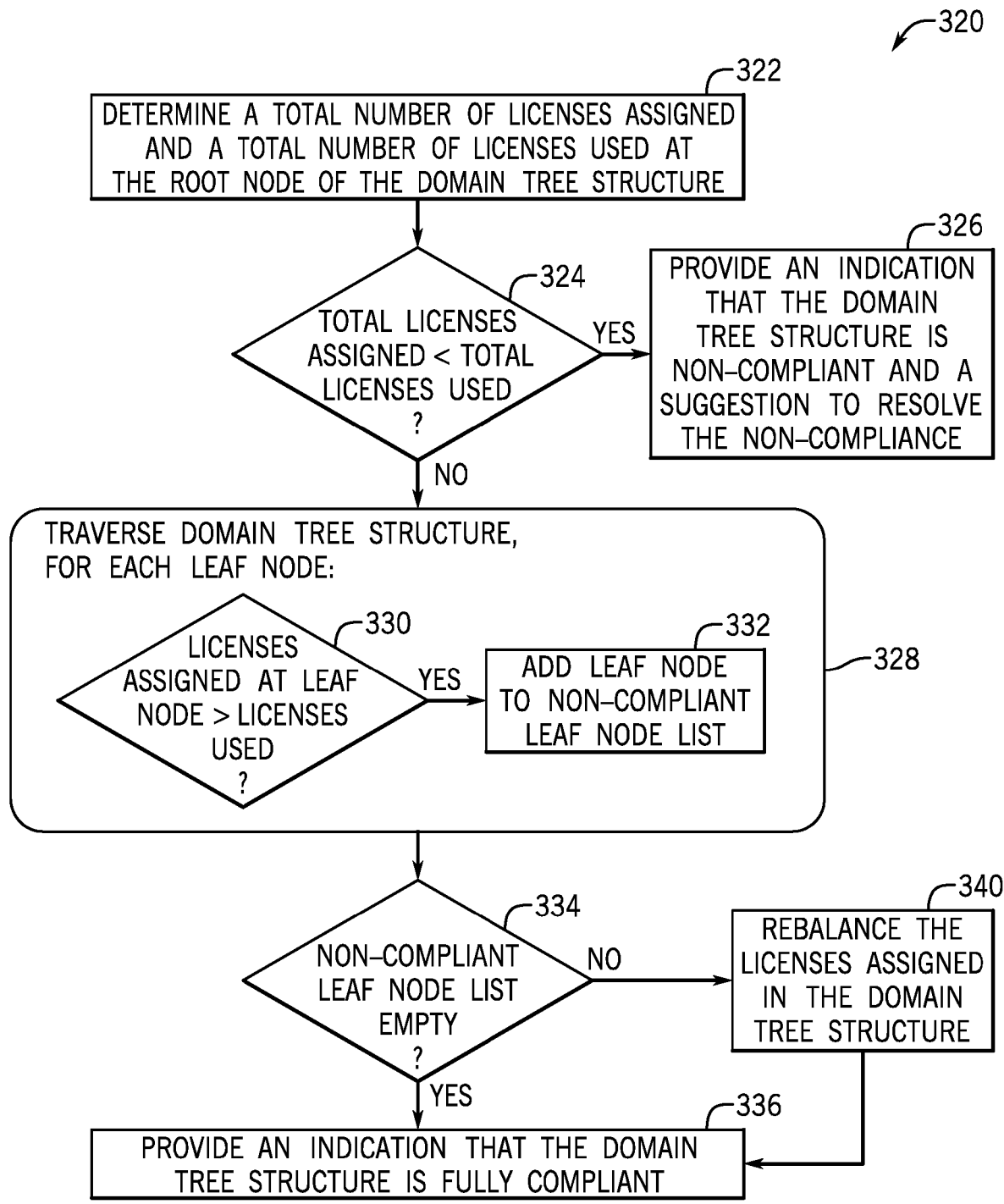
FIG. 11 is a flow diagram illustrating an example embodiment of a process whereby the DSLMS determines and manages compliance for a domain-separated client instance, in accordance with aspects of the present disclosure.

FIG. 11 is a flow diagram illustrating an example embodiment of a process 320 whereby the DSLMS 230 determines and manages compliance for a domain-separated client instance 102. The illustrated process 320 is merely an example, and in other embodiments, the process 320 may include additional steps, fewer steps, repeated steps, and so forth, in accordance with the present disclosure. The illustrated process 320 may be stored in at least one suitable memory and (e.g., memory 206) executed by at least suitable one processor (e.g., processor 202).

The illustrated embodiment of the process 320 begins with determining whether or not the domain tree structure 232, as a whole, is compliant. To do this, the processor 202 determines (block 322) a total number of licenses assigned to, and a total number of licenses used by, the domain-separated client instance 102 from the license information 260 stored in the root node of the domain tree structure 232. Moreover, the processor 202 then determines (block 324) whether the total number of licenses assigned to the domain-separated client instance 102 less than the total licenses used by the instance. When the processor 202 determines that the total number of licenses is less than the total licenses used, the processor 202 provides (block 326) an indication that the domain tree structure 232 is non-compliant, which may include a prompt or suggestion to resolve the non-compliance. For example, the DSLMS 230 may provide an appropriate administrator with a notification that indicates that the number of licenses assigned to the domain-separated client instance 102 is deficient. In certain embodiments, the notification may include a prompt to purchase additional software licenses to bring the domain-separated client instance 102 into at least partial compliance.

When the processor 202 determines that the domain tree structure 232 is either fully-compliant or partially-compliant in block 324, the illustrated embodiment of the process 320 continues with determining whether each domain represented by the domain tree structure 232 is compliant. To do this, the illustrated process 320 continues with the processor 202 traversing the domain tree structure 232 and performing a set of actions for each of the leaf nodes 252 encountered, as indicated by the block 328. For the illustrated embodiment, these actions include determining (block 330), based on the license information 260 of the leaf node, whether the number of licenses assigned is less that the number of licenses used. When the number of licenses assigned is less that the number of licenses used, then the leaf node is added (block 332) to a non-compliant leaf node list.

For the illustrated embodiment, once the processor 202 has traversed the domain tree structure 232 and checked the compliance of each of the leaf nodes 252, the process 320 continues with the processor 202 determining (block 334) whether the non-compliant leaf node list is empty. When the non-compliant leaf node list is empty, then the processor 202 provides (block 336) an indication that the domain tree structure is fully compliant. However, when the non-compliant leaf node list includes a least one non-compliant leaf node, the processor 202 may determine that the domain tree structure 232 is partially complaint, and as such, the processor 202 may rebalance (block 340) the licenses assigned to the various domains of the domain-separated client instance 102 to bring all of the domains into compliance.

Figure 12:
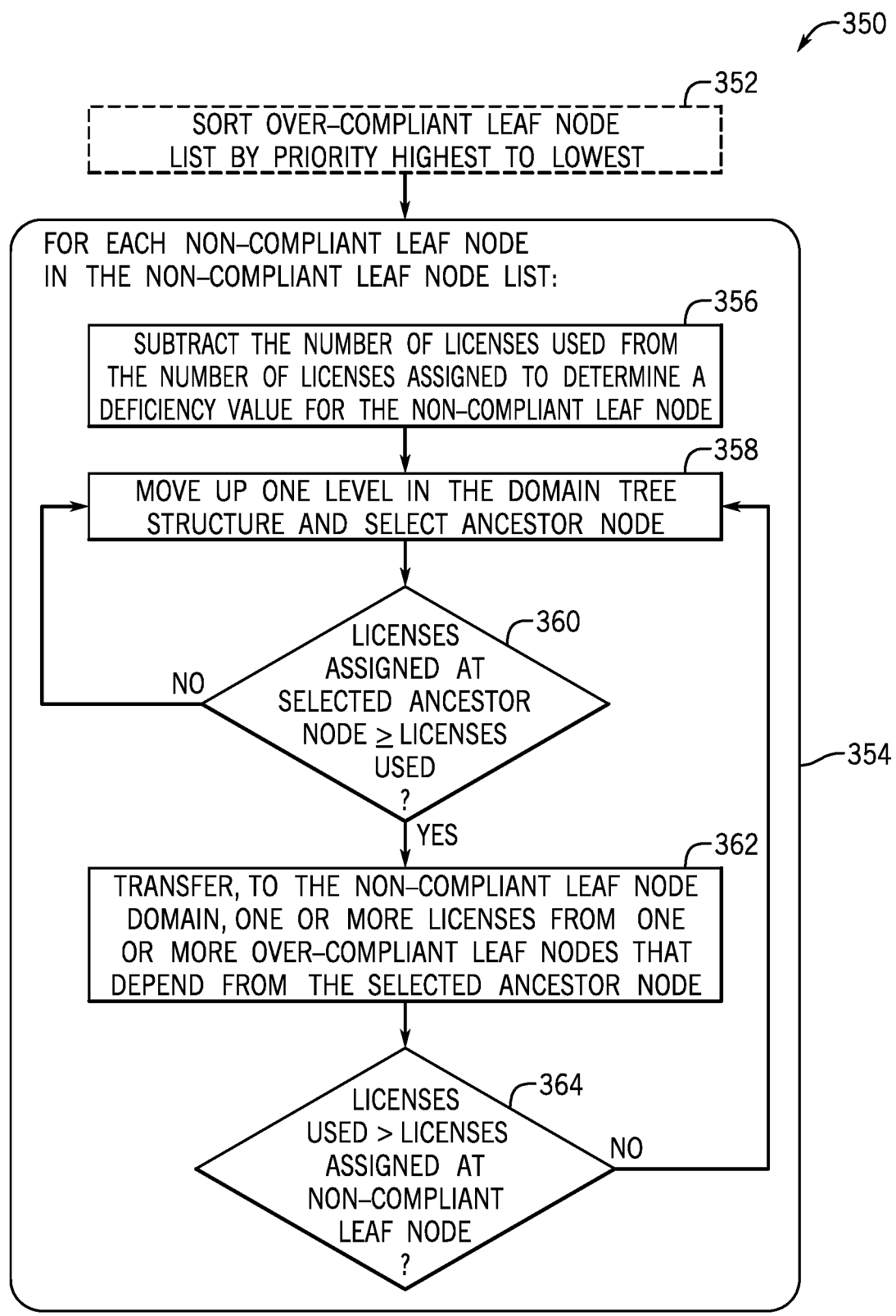
FIG. 12 is a flow diagram illustrating an example embodiment of a process whereby the DSLMS rebalances licenses between the domains of the domain-separated client instance to render the domain tree structure fully-compliant, in accordance with aspects of the present disclosure.

FIG. 12 is a flow diagram illustrating an example embodiment of a process 350 by which the DSLMS rebalances licenses assigned to the various domains of the domain-separated client instance 102 to bring all of the domains into compliance. As such, the process 350 corresponds to the actions set forth in block 340 of FIG. 11. Therefore, the process 350 is executed in the context of the process 320 of FIG. 11, which defines and populates the non-compliant leaf node list, as discussed above. The process 350 illustrated in FIG. 12 is merely an example, and in other embodiments, the process 350 may include additional steps, fewer steps, repeated steps, and so forth, in accordance with the present disclosure. The illustrated process 350 may be stored in at least one suitable memory (e.g., memory 206) and executed by at least suitable one processor (e.g., processor 202).

For embodiments that include priority values for each of the domains represented in the domain tree structure 232, as mentioned above with respect to FIG. 9, the process 350 may begin with the processor 202 sorting (block 352) the non-compliant leaf node list by descending priority values, highest to lowest. It may be appreciated that this ensures that non-compliant domains represented in the domain tree structure 232 will be brought into compliance in order of descending priority values. For embodiments that lack priority values, the actions of block 352 may be skipped.

The embodiment of the process 350 illustrate in FIG. 12 continues with the processor 202 performing a number of actions for each non-compliant leaf node in the non-compliant leaf node list, as indicated by the block 354. For the illustrated example, these actions include subtracting (block 356) the number of licenses used from the number of licenses assigned to determine a deficiency value for the non-compliant leaf node. Then, the processor 202 moves up (block 358) one level in the domain tree structure 232 and selects the ancestor node from this level, in this case the parent node of the current non-compliant leaf node. The processor 202 then determines (block 360) whether the number of licenses assigned at the selected ancestor node is greater than the number of licenses used. When the processor 202 determines that the number of licenses assigned to the selected ancestor node is not greater than the number of licenses used, this means that no licenses are available at this level in the domain tree structure 232 to transfer to another node. In response to this condition, the processor 202 again moves up (block 358) one level in the domain tree structure 232 and selects the ancestor node of the currently selected node, in this case the grandparent node of the non-compliant leaf node, and then determines (block 360) whether the number of licenses assigned at the selected ancestor node is greater than the number of licenses used.

When the processor 202 determines (block 360) that the number of licenses assigned at the selected ancestor node is greater than the number of licenses used, then the processor 202 may identify the selected node as representing a non-leaf domain that is over-compliant and, as such, has depending leaf nodes with unused licenses that are available for transfer to a non-compliant domain to bring the partially-compliant domain tree structure closer to compliance. As such, the processor 202 transfers (block 362), to the non-compliant leaf node domain, one or more licenses from one or more over-compliant leaf nodes that depend from the selected ancestor node, as discussed below. After transferring one or more licenses to the non-compliant leaf node in block 362, the processor 202 determines whether the non-compliant leaf node has been brought into compliance by determining (block 364) whether number of the licenses used by the leaf node is still greater than the number of licenses assigned. When the non-compliant leaf node is determined to still be non-compliant in block 364, then the processor 202 again moves up (block 358) another level in the domain tree structure 232, selecting the ancestor node of the currently selected node, in this case the great-grandparent of the non-compliant leaf node, and repeats the actions of blocks 360, 362, and 364 until the non-compliant leaf node is brought into compliance. Once the leaf node is determined to be compliant in block 364, then the "for loop" of block 354 proceeds to repeat blocks 356, 358, 360, 362, and 364 for the next non-compliant leaf node in the non-compliant leaf node list until all leaf nodes in the non-compliant leaf node list are brought into compliance.

Figure 13:
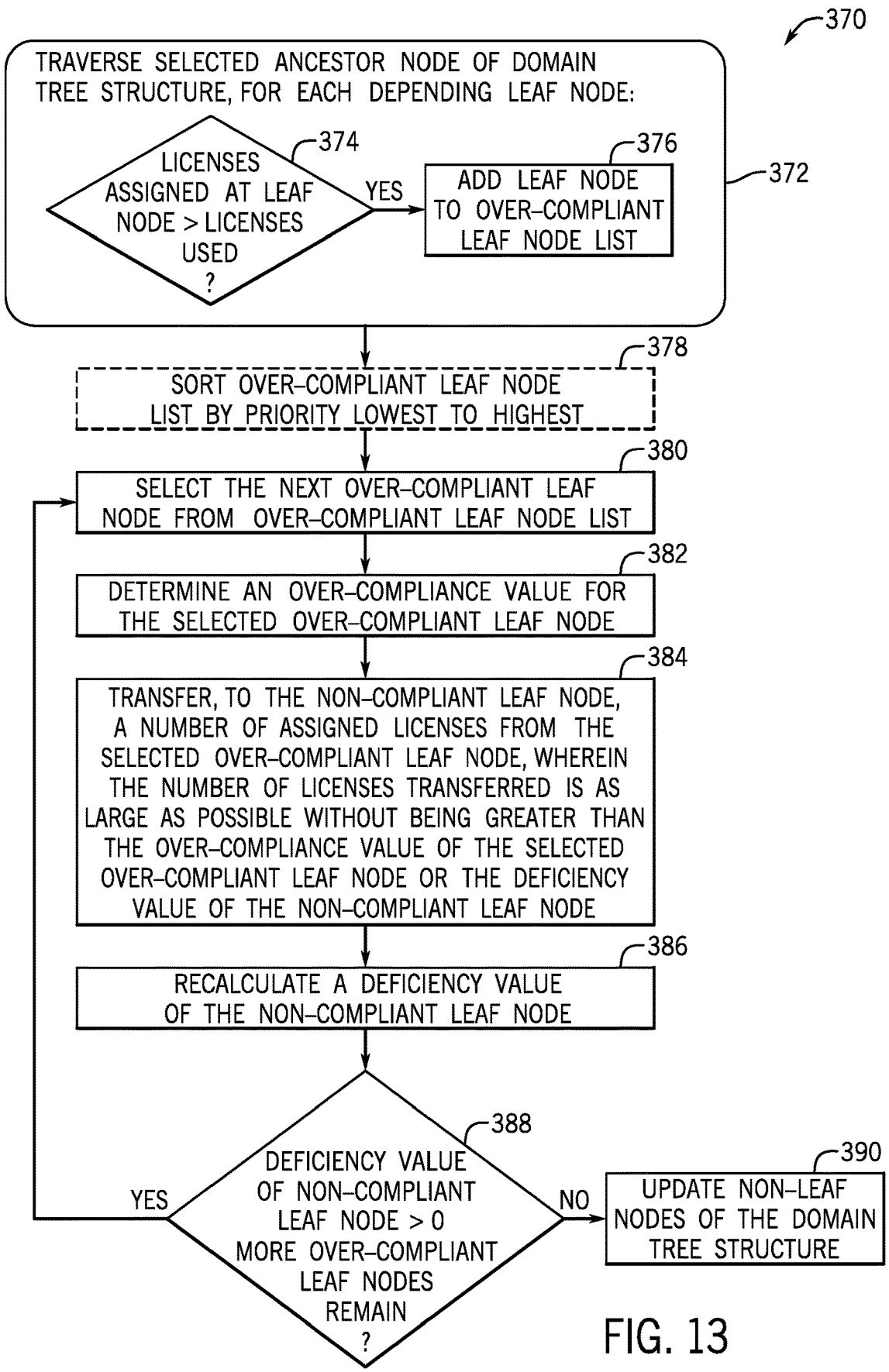
FIG. 13 is a flow diagram illustrating an example embodiment of a process whereby the DSLMS transfers licenses from over-compliant leaf nodes to non-compliant leaf nodes of the domain tree structure when rebalancing licenses between the domains of the domain-separated client instance, in accordance with aspects of the present disclosure.

FIG. 13 is a flow diagram illustrating an example embodiment of a process 370 by which the DSLMS 230 transfers licenses from over-compliant leaf nodes to a non-compliant leaf node of the domain tree structure 232. As such, the process 370 corresponds to the actions set forth in block 362 of FIG. 12. Therefore, the process 370 is executed in the context of the process 350 of FIG. 12, which defines the current non-compliant leaf node that is receiving one or more transferred licenses, as well as the selected over-compliant ancestor node of the non-compliant leaf node, as discussed above with respect to FIG. 12. The illustrated process 370 is merely an example, and in other embodiments, the process 370 may include additional steps, fewer steps, repeated steps, and so forth, in accordance with the present disclosure. The illustrated process 370 may be stored in at least one suitable memory (e.g., memory 206) and executed by at least suitable one processor (e.g., processor 202).

The illustrated embodiment of the process 370 begins with the processor 202 traversing the portion of the domain tree structure 232 that depends from the selected ancestor node, and then performing a set of actions for each leaf node that depends (directly or indirectly) from the ancestor node, as indicated by block 372. For the illustrated embodiment, these actions include the processor 202 determining whether each depending leaf node is over-compliant by determining (block 374) whether the number of licenses assigned is greater than the number of licenses used at the leaf node. When the number of licenses assigned is greater than the number of licenses used at the leaf node, then the processor 202 adds (block 376) the depending leaf node to an over-compliant leaf node list.

For embodiments that include priority values, the process 370 continues with the processor 202 sorting (block 378) the over-compliant leaf node list by ascending priority, from lowest to highest. For such embodiments, this ensures that licenses are preferentially transferred to the non-compliant leaf node from lower priority over-compliant leaf nodes before higher priority over-compliant leaf nodes. However, for embodiments that do not include priority values, the actions of block 378 may be skipped.

The illustrated embodiment of the process 370 proceeds with the processor 202 selecting (block 380) the next over-compliant leaf node from the over-compliant leaf node list. Then, the processor 202 determines (block 382) an over-compliance value for the selected over-compliant leaf node by determining the difference between the number of licenses assigned and the number of licenses used. Next, the processor 202 transfers (block 384), to the non-compliant leaf node, a number of assigned licenses from the selected over-compliant leaf node. It should be noted that the number of licenses transferred is as large as possible without being greater than the over-compliance value of the selected over-compliant leaf node or the deficiency value of the non-compliant leaf node. Once the licenses have been transferred, the processor 202 may recalculate (block 386) a deficiency value of the non-compliant leaf node by subtracting the number of licenses used from the number of licenses assigned at the non-compliant leaf node. As indicated by block 388, when the deficiency value is greater than zero, indicating that the leaf node remains non-compliant, and when more over-compliant leaf nodes remain in the over-compliant leaf node list, then the processor 202 may return to block 380, select the next over-compliant leaf node from the over-compliant leaf node list, and repeat the actions of blocks 382, 384, 386, and 388 for the selected over-compliant leaf node.

Once the processor 202 determines (block 388) that the non-compliant leaf node has a deficiency value that is less than or equal to zero, indicating that the non-compliant leaf node has been brought into compliance, or when the processor 202 determines that no more over-compliant leaf nodes remain in the over-compliant leaf node list, then the processor 202 may determine that the leaf nodes of the domain tree structure 232 have been suitably rebalanced and are compliant. However, as mentioned, the license information 260 of the non-leaf nodes 254 of the domain tree structure 232 are calculated based on the license information 260 of depending leaf nodes 252. As such, the process 370 concludes with the processor 202 updating (block 390) the license information 260 of the non-leaf nodes 254 of the domain tree structure 232. For example, the processor 202 may execute the post-order traversal of the domain tree structure 232 and recalculate the license information 260 for each of the non-leaf nodes 254, as set forth in block 310 of FIG. 10.

The technical effects of the present disclosure include a domain-separated license management system (DSLMS) for managing software license compliance in a domain-separated architecture. Present embodiments utilize a domain tree structure to track current software licenses assignments and usage by each domain of a domain-separated client instance, and then uses this license information to determine whether the domain-separated client instance is non-compliant, partially-compliant, or fully-compliant. When the DSLMS determines that the domain-separated client instance is partially-compliant, the DSLMS transfers available licenses from over-compliant domains to non-compliant domains within the domain-separated client instance to bring the instance into full compliance. Additionally, in certain embodiments, present embodiments enable different domains of the domain-separated client instance to be assigned respective priority values, which the DSLMS uses to prioritize which domains preferentially receive or lose licenses when rebalancing licenses within the domain-separated client instance.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f).

However, for any claims containing elements designated in any other manner, it is intended that such elements are not to be interpreted under 35 U.S.C. 112(f).

The invention claimed is:

1. A domain-separated licensing management system (DSLMS), comprising:
    at least one memory configured to store a domain tree structure;
    at least one processor configured to execute instructions stored in the at least one memory to perform actions comprising:
        determining a respective number of software licenses assigned and a respective number of software licenses used at each leaf node of the domain tree structure;
        calculating a respective number of software licenses assigned and a respective number of software licenses used at each non-leaf node of the domain tree structure based on the respective number of software licenses assigned and the respective number of software licenses used at each leaf node of the domain tree structure; and
        in response to determining that the domain tree structure is partially-compliant, rebalancing the domain tree structure by transferring a portion of the respective number of software licenses assigned to one or more over-compliant leaf nodes of the domain tree structure to one or more non-compliant leaf nodes of the domain tree structure to render the domain tree structure fully-compliant.

2. The DSLMS of claim 1, wherein to determine the respective number of software licenses assigned and the respective number of software licenses used at each leaf node, the at least one processor is configured to execute the instructions stored in the at least one memory to perform actions comprising:
    executing a discovery and reconciliation job that accesses each granular domain of a domain-separated client instance represented by the domain tree structure to determine the respective number of software licenses assigned and the respective number of software licenses used at each leaf node of the domain tree structure.

3. The DSLMS of claim 1, wherein to calculate the respective number of software licenses assigned and the respective number of software licenses used at each non-leaf node, the at least one processor is configured to execute the instructions stored in the at least one memory to perform actions comprising:
    calculating the respective number of software licenses assigned at each non-leaf node of the domain tree structure as a sum of the respective number of software licenses assigned at each leaf node that directly or indirectly depends from each non-leaf node of the domain tree structure; and
    calculating the respective number of software licenses used at each non-leaf node of the domain tree structure as a sum of the respective number of software licenses used at each leaf node that directly or indirectly depends from each non-leaf node of the domain tree structure.

4. The DSLMS of claim 1, wherein, to determine that the domain tree structure is partially-compliant, the at least one processor is configured to execute the instructions stored in the at least one memory to perform actions comprising:
    determining that the respective number of software licenses assigned is greater than the respective number of software licenses used at a top node of the domain tree structure.

5. The DSLMS of claim 4, wherein, to determine that the domain tree structure is partially-compliant, the at least one processor is configured to execute the instructions stored in the at least one memory to perform actions comprising:
    determining that the respective number of software licenses assigned is less than the respective number of software licenses used at each of the one or more non-compliant leaf nodes of the domain tree structure.

6. The DSLMS of claim 4, wherein, to determine that the domain tree structure is fully-compliant after rebalancing, the at least one processor is configured to execute the instructions stored in the at least one memory to perform actions comprising:
    determining that the respective number of software licenses assigned is greater than or equal to the respective number of software licenses used at each leaf node of the domain tree structure.

7. The DSLMS of claim 1, wherein, to rebalance the domain tree structure, the at least one processor is configured to execute the instructions stored in the at least one memory to perform actions comprising:
    for each non-compliant leaf node of the one or more non-compliant leaf nodes of the domain tree structure:
        (A) determining a deficiency value of the non-compliant leaf node by subtracting the respective number of software licenses used from the respective number of software licenses assigned at the non-compliant leaf node;
        (B) selecting an ancestor node of the non-compliant leaf node;
        (C) in response to determining that the ancestor node has available software licenses, transferring licenses from the ancestor node to the non-compliant leaf node and updating the deficiency value of the non-compliant leaf node; and
        (D) in response to determining that the ancestor node does not have available software licenses or that the deficiency value of the non-compliant leaf node is greater than zero, returning to step (B).

8. The DSLMS of claim 7, wherein, to transfer licenses from the ancestor node to the non-compliant leaf node, the at least one processor is configured to execute the instructions stored in the at least one memory to perform actions comprising:
    (A) identifying a set of over-compliant leaf nodes that directly or indirectly depends from the ancestor node of the domain tree structure;
    (B) selecting an over-compliant leaf node from the set of over-compliant leaf nodes;
    (C) determining an over-compliance value by subtracting the respective number of software licenses assigned from the respective number of software licenses used at the selected over-compliant leaf node;
    (D) transferring a number of the respective software licenses assigned at the over-compliant leaf node to the non-compliant leaf node, wherein the number is not greater than the over-compliance value of the selected over-compliant leaf node or the deficiency value of the non-compliant leaf node;
    (E) updating the deficiency value of the non-compliant leaf node; and (F) in response to determining that the deficiency value is greater than zero and that another over-compliant leaf node remains in the set of over-compliant leaf nodes, returning to step (B); and (G) in response to determining that the deficiency value is not greater than zero, updating the respective number of software licenses assigned and the respective number of software licenses used at each non-leaf node of the domain tree.

9. The DSLMS of claim 1, wherein the at least one memory is configured to store a domain-separated client instance having granular domains and to store the domain tree structure, wherein each leaf node of the domain tree structure represents a respective granular domain of the domain-separated client instance and each non-leaf node of the domain tree structure represents a respective group of the granular domains.

10. A method of managing software licenses in a domain-separated client instance using a domain tree structure having leaf nodes and non-leaf nodes, the method comprising:

determining a respective number of software licenses assigned and a respective number of software licenses used at each leaf node of the domain tree structure;

calculating a respective number of software licenses assigned and a respective number of software licenses used at each non-leaf node of the domain tree structure based on the respective number of software licenses assigned and the respective number of software licenses used at each leaf node of the domain tree structure; and in response to determining that the domain tree structure is partially-compliant, rebalancing the domain tree structure by transferring a portion of the respective number of software licenses assigned to one or more over-compliant leaf nodes of the domain tree structure to one or more non-compliant leaf nodes of the domain tree structure to render the domain tree structure fully-compliant.

11. The method of claim 10, wherein determining the respective number of software licenses assigned and the respective number of software licenses used at each leaf node, comprises:

executing a discovery and reconciliation job that accesses each granular domain of the domain-separated client instance to determine the respective number of software licenses assigned and the respective number of software licenses used at each leaf node of the domain tree structure.

12. The method of claim 10, wherein calculating the respective number of software licenses assigned and the respective number of software licenses used at each non-leaf node comprises:

calculating the respective number of software licenses assigned at each of the non-leaf nodes of the domain tree structure as a sum of the respective number of software licenses assigned at all of the leaf nodes that directly or indirectly depends from each non-leaf node of the domain tree structure; and calculating the respective number of software licenses used at each non-leaf node of the domain tree structure as a sum of respective number of software licenses used at each leaf node that directly or indirectly depends from each non-leaf node of the domain tree structure.

13. The method of claim 10, wherein rebalancing the domain tree structure comprises:

identifying a set of non-compliant leaf nodes from the domain tree structure; and for each non-compliant leaf node of the set of non-compliant leaf nodes:

(A) determining a deficiency value of the non-compliant leaf node by subtracting the respective number of software licenses used from the respective number of software licenses assigned at the non-compliant leaf node;

(B) selecting an ancestor node of the non-compliant leaf node;

(C) in response to determining that the ancestor node has available software licenses, transferring licenses from the ancestor node to the non-compliant leaf node and updating the deficiency value of the non-compliant leaf node; and (D) in response to determining that the ancestor node does not have available software licenses or that the deficiency value of the non-compliant leaf node is greater than zero, returning to step (B).

14. The method of claim 13, comprising:

sorting the set of non-compliant leaf nodes in descending order by a priority value of each of the non-compliant leaf nodes before step (A).

15. The method of claim 13, wherein transferring licenses from the ancestor node to the non-compliant leaf node comprises:

(A) identifying a set of over-compliant leaf nodes that directly or indirectly depends from the ancestor node of the domain tree structure;

(B) selecting an over-compliant leaf node from the set of over-compliant leaf nodes;

(C) determining an over-compliance value by subtracting the respective number of software licenses assigned from the respective number of software licenses used at the selected over-compliant leaf node;

(D) transferring a number of the respective software licenses assigned at the selected over-compliant leaf node to the non-compliant leaf node, wherein the number is less than or equal to the over-compliance value of the over-compliant leaf node and the deficiency value of the non-compliant leaf node;

(E) updating the deficiency value of the non-compliant leaf node;

(F) in response to determining that the deficiency value is greater than zero and that another over-compliant leaf node remains in the set of over-compliant leaf nodes, returning to step (B); and (G) in response to determining that the deficiency value is not greater than zero, updating the respective number of software licenses assigned and the respective number of software licenses used at each non-leaf node of the domain tree.

16. The method of claim 15, comprising:

sorting the set of over-compliant leaf nodes in ascending order by a priority value of each of the over-compliant leaf nodes after step (A) and before step (B).

17. A non-transitory, computer-readably medium storing instructions executable by a processor of a computing device to manage software licenses using a domain tree structure that corresponds to a structure of a domain-separated client instance, wherein the instructions comprise instructions to:

determine a respective number of software licenses assigned and a respective number of software licenses used at each granular domain of the domain-separated client instance;

populate corresponding leaf nodes of the domain tree structure with the respective number of software licenses assigned and the respective number of software licenses used at each granular domain of the domain-separated client instance;

populate non-leaf nodes of the domain tree structure with a respective number of software licenses assigned and a respective number of software licenses used based on the respective number of software licenses assigned and the respective number of software licenses used at leaf nodes of the domain tree structure that depend from each of the non-leaf nodes of the domain tree structure; and determine that the domain tree structure is partially compliant, and in response, rebalance the domain tree structure by transferring a portion of the respective number of software licenses assigned to one or more over-compliant leaf nodes of the domain tree structure to one or more non-compliant leaf nodes of the domain tree structure to render the domain tree structure fully-compliant.

18. The medium of claim 17, wherein the instructions to rebalance the domain tree structure include instructions to:
for each non-compliant leaf node of the one or more non-compliant leaf nodes of the domain tree structure:
  (A) determine a deficiency value of the non-compliant leaf node;
  (B) select an ancestor node of the non-compliant leaf node;
  (C) in response to determining that the ancestor node has available software licenses, transfer software licenses from the ancestor node to the non-compliant leaf node and then update the deficiency value of the non-compliant leaf node; and
  (D) in response to determining that the ancestor node does not have available software licenses or that the deficiency value of the non-compliant leaf node is greater than zero, return to step (B).

19. The medium of claim 18, wherein the instructions to transfer software licenses from the ancestor node to the non-compliant leaf node comprise:
  (A) identify a set of over-compliant leaf nodes that directly or indirectly depends from the ancestor node of the domain tree structure;
  (B) select an over-compliant leaf node from the set of over-compliant leaf nodes;
  (C) determine an over-compliance value of the selected over-compliant leaf node;
  (D) transfer a number of the respective software licenses assigned at the selected over-compliant leaf node to the non-compliant leaf node, wherein the number is less than or equal to the over-compliance value of the over-compliant leaf node and the deficiency value of the non-compliant leaf node;
  (E) update the deficiency value of the non-compliant leaf node;
  (F) in response to determining that the deficiency value of the non-compliant leaf node is greater than zero, return to step (B); and
  (G) in response to determining that the deficiency value is not greater than zero, update the respective number of software licenses assigned and the respective number of software licenses used at each non-leaf node of the domain tree structure based on the respective number of software licenses assigned and the respective number of software licenses used at leaf nodes of the domain tree structure that depend from each non-leaf node of the domain tree structure.

* * * * *